Aug. 14, 1923.

A. J. EVERS ET AL 1,464,649

BLANK CUTTING AND TRANSPORTING MECHANISM

Filed Feb. 2, 1922    9 Sheets-Sheet 1

Witness:
A.J. Sauser

Inventors:
Arthur J. Evers
Herbert J. Sauvage
By Walter M. Fuller Atty.

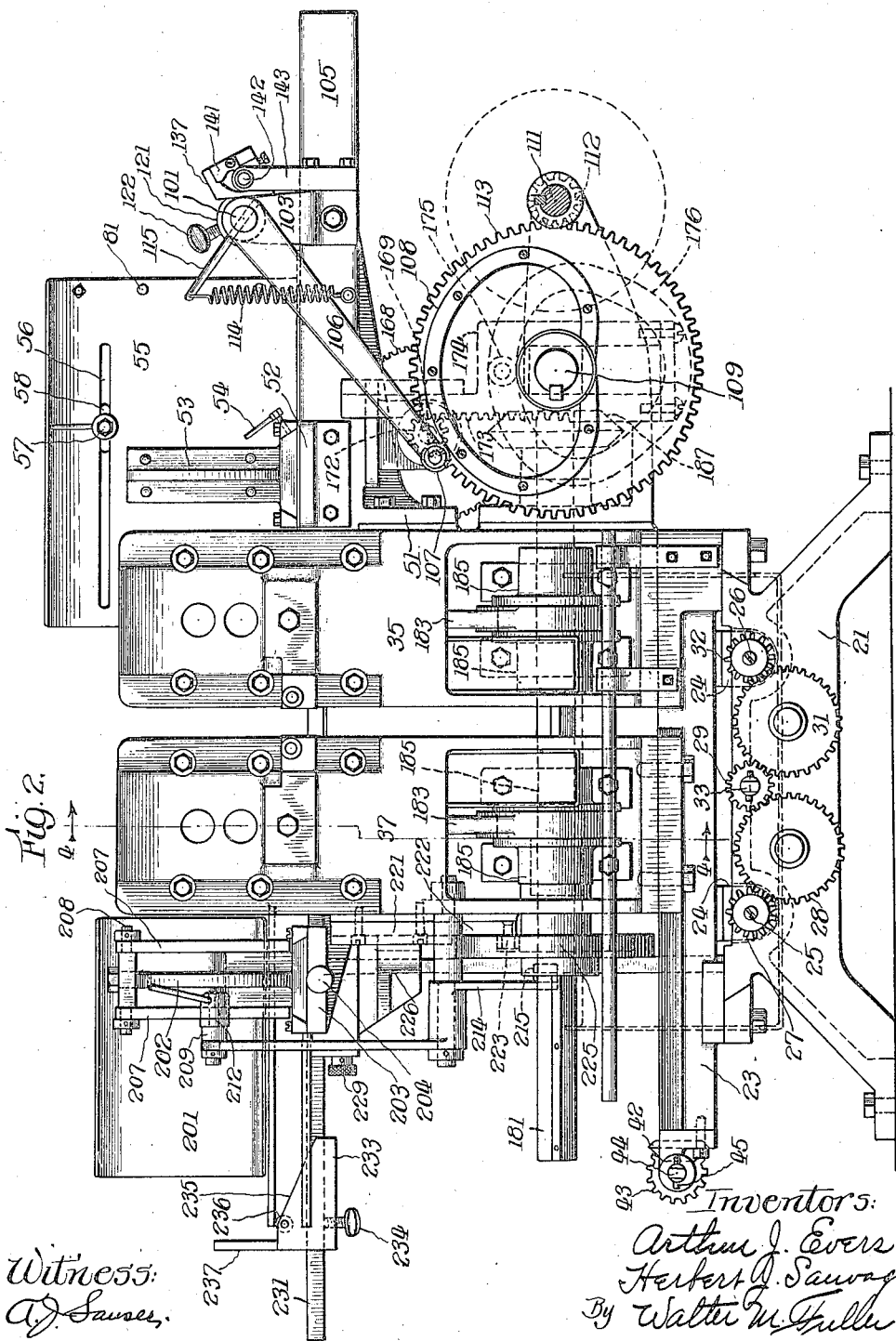

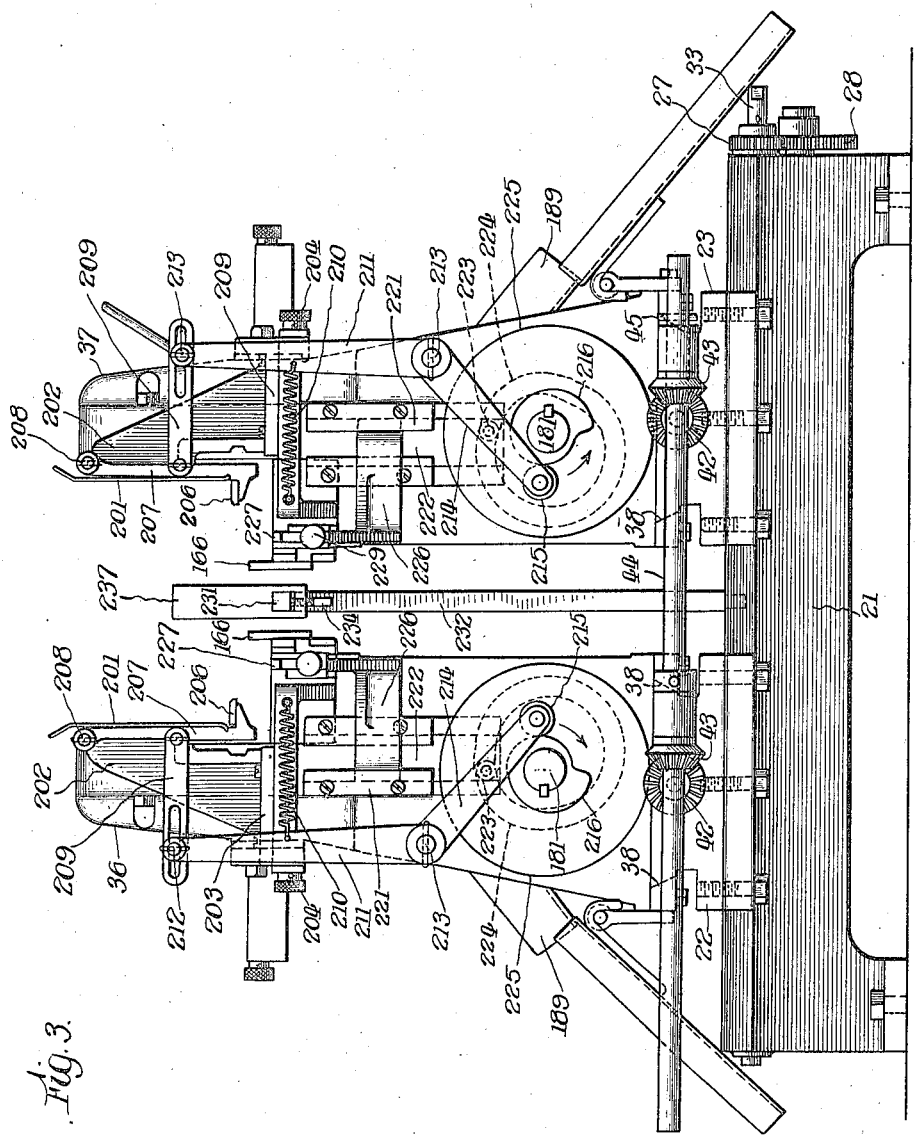

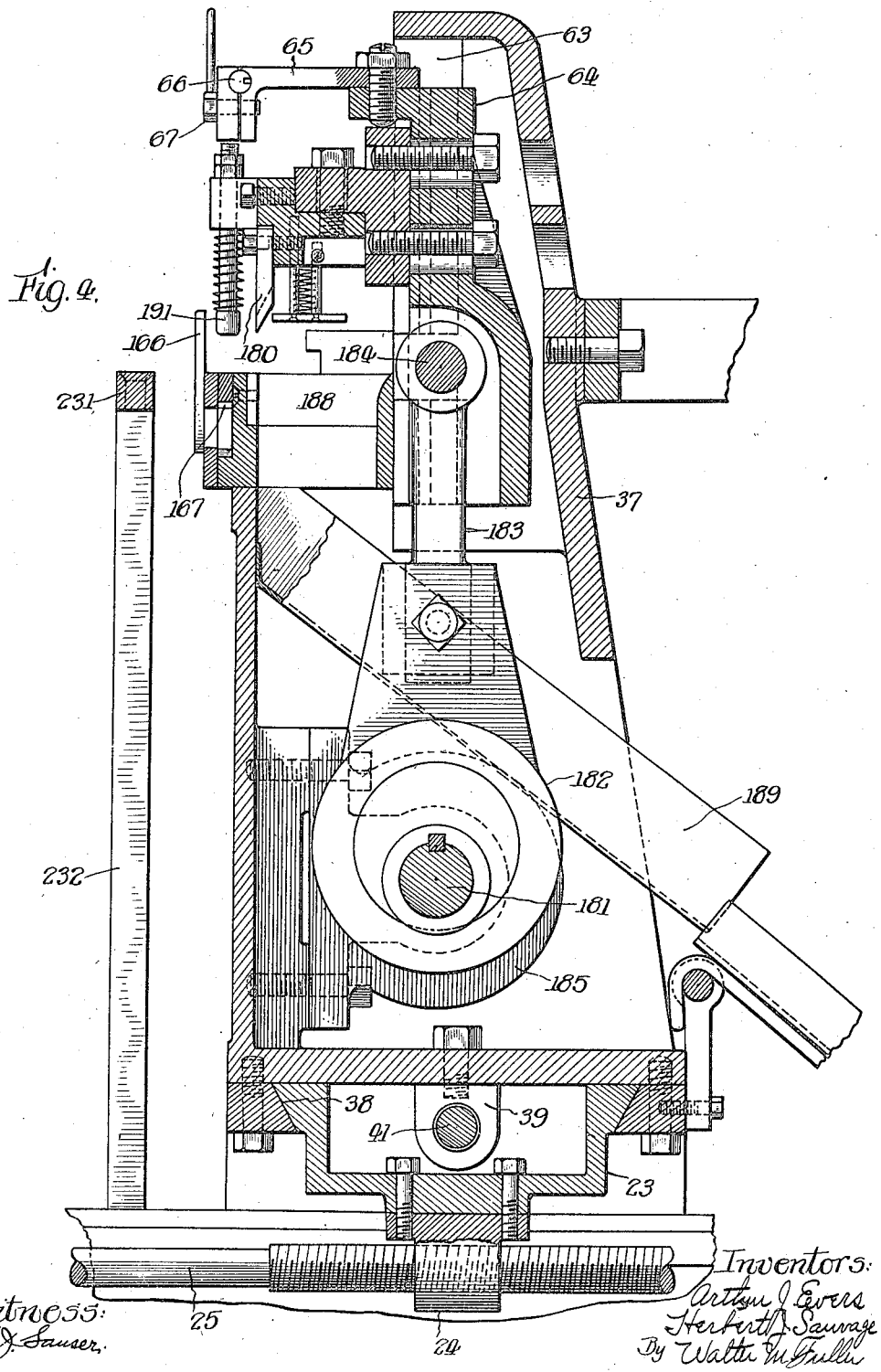

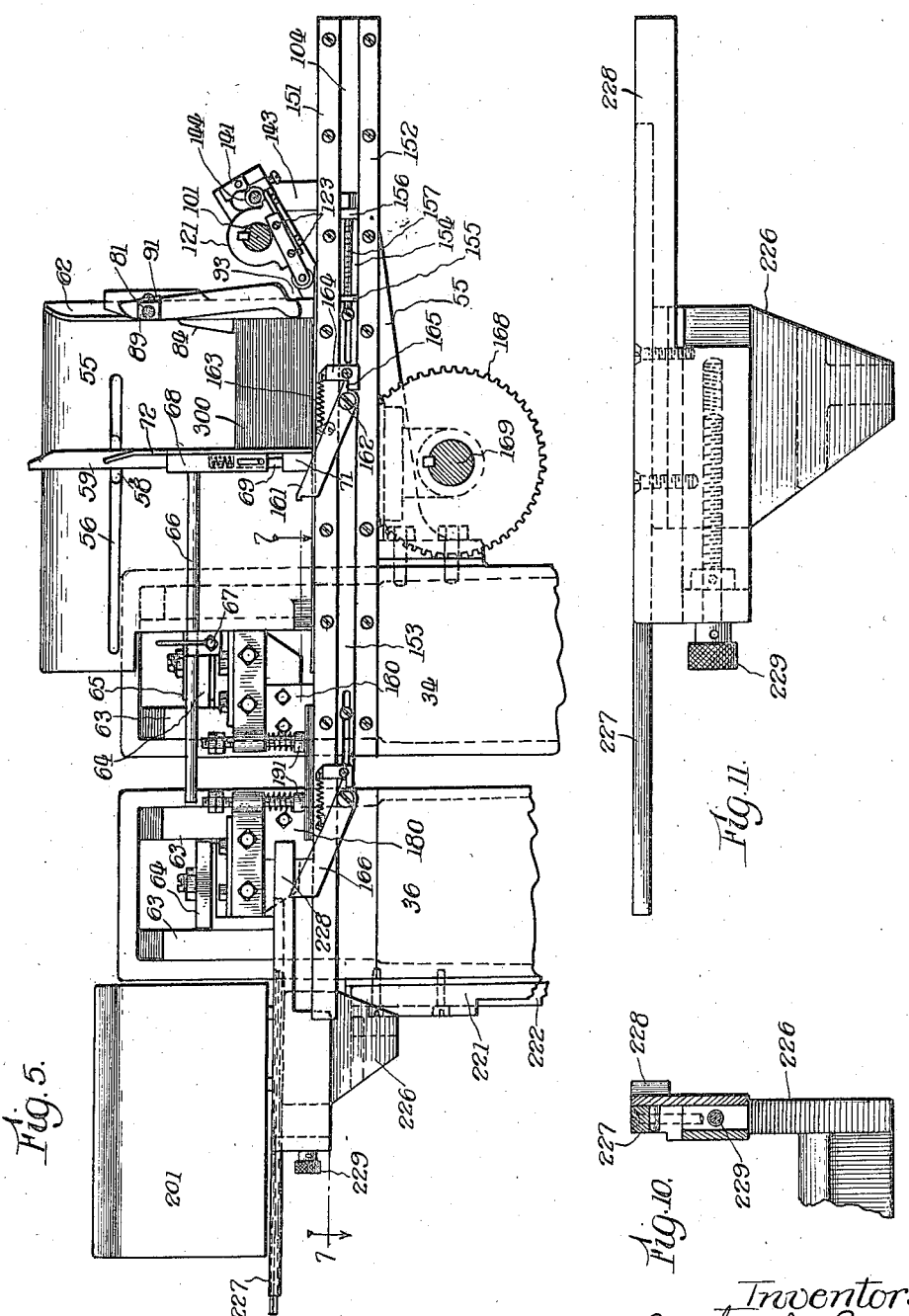

Aug. 14, 1923.
A. J. EVERS ET AL
1,464,649
BLANK CUTTING AND TRANSPORTING MECHANISM
Filed Feb. 2, 1922  9 Sheets-Sheet 6
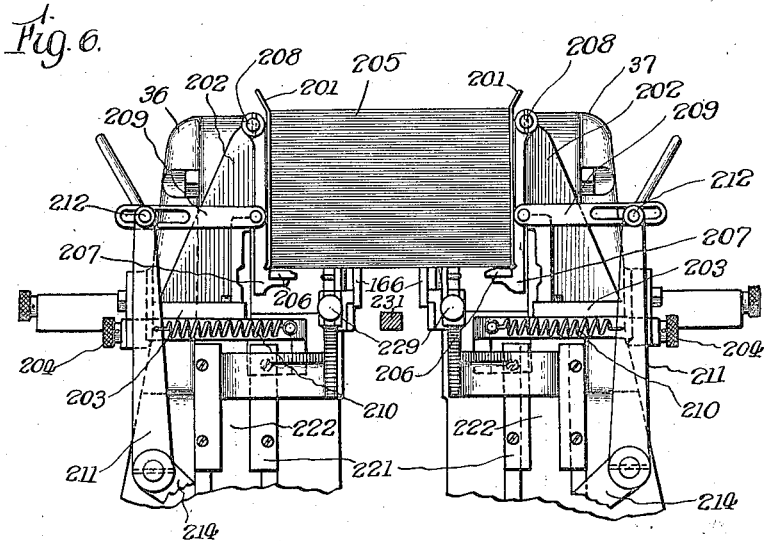
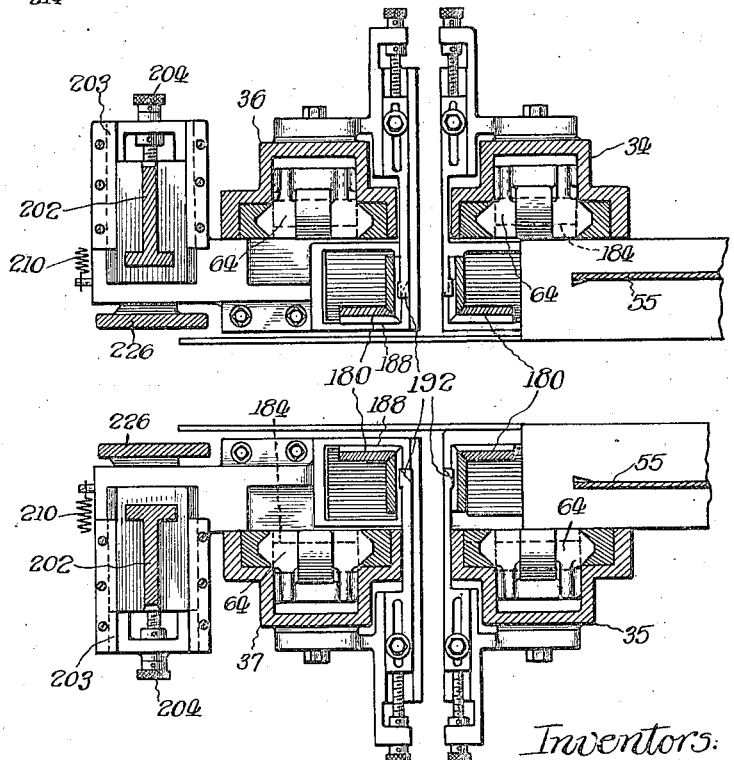

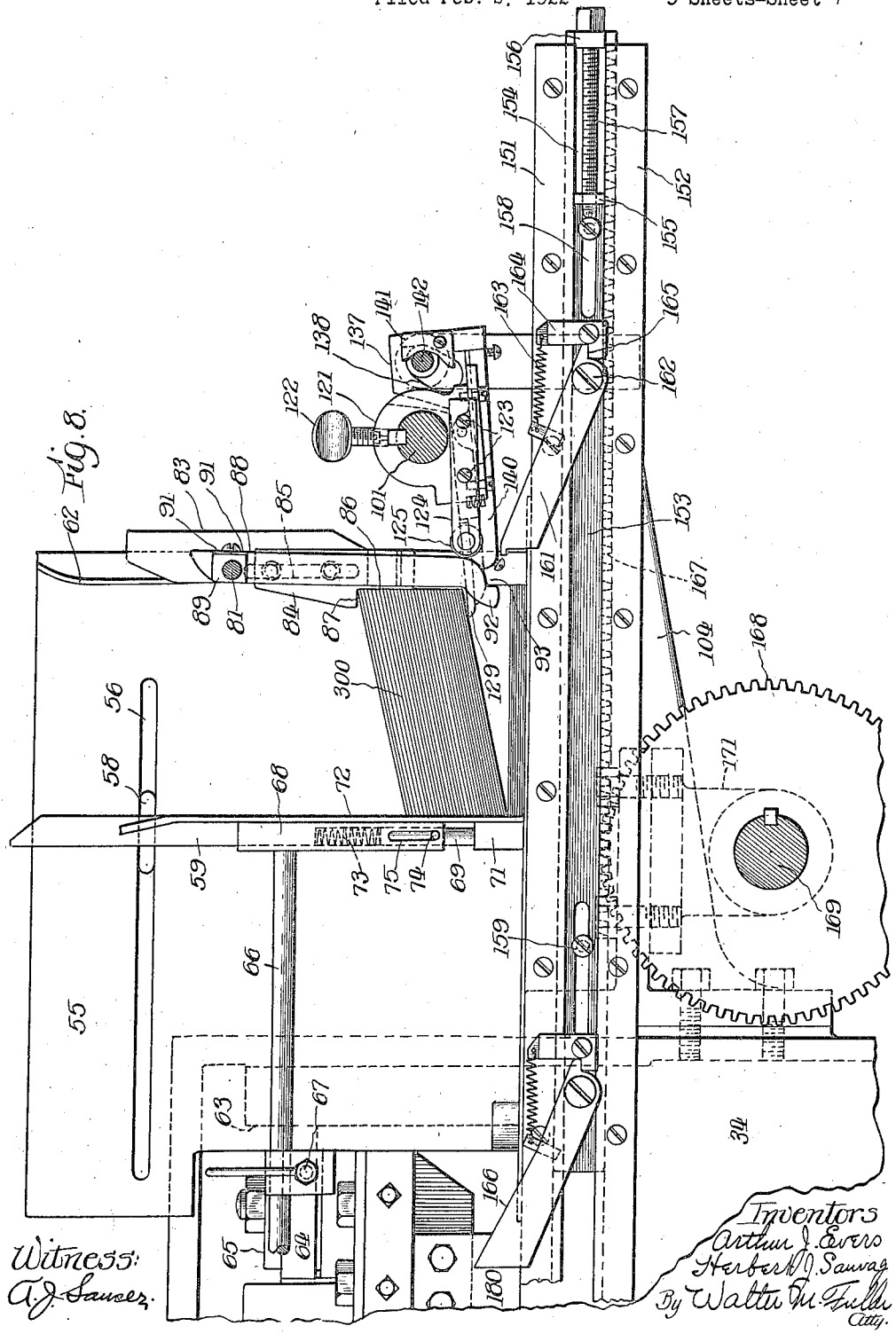

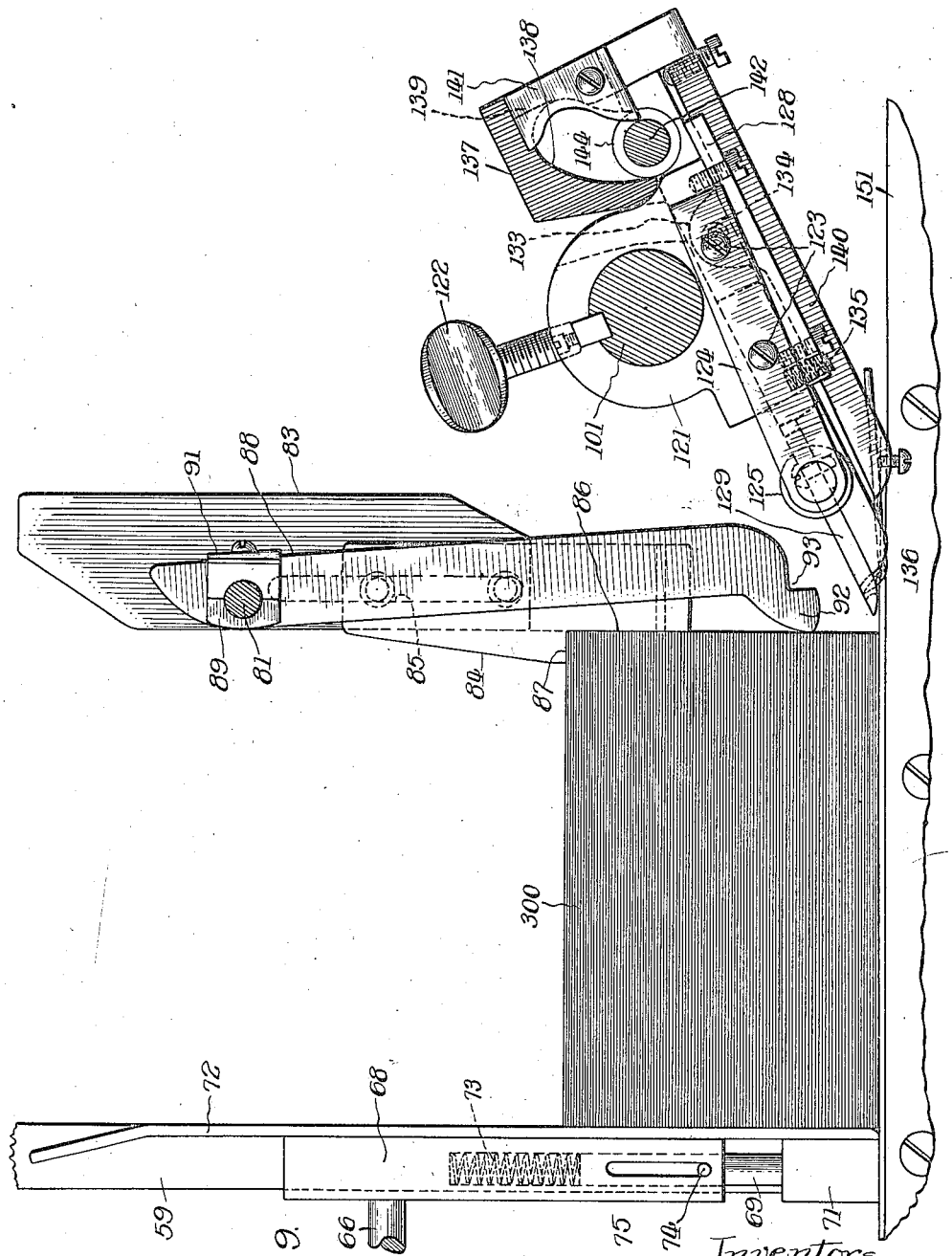

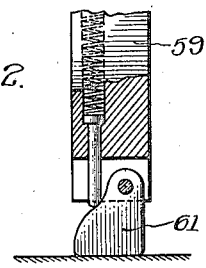
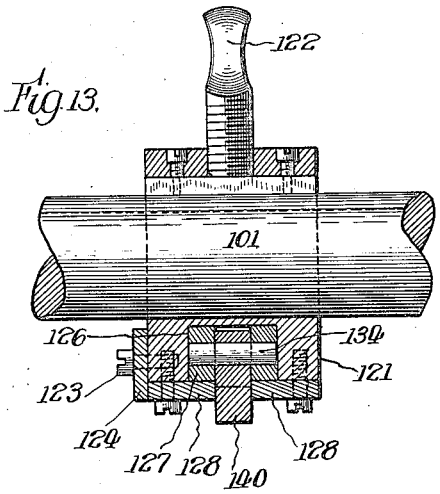
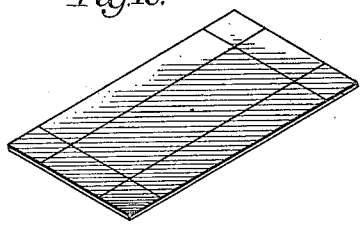
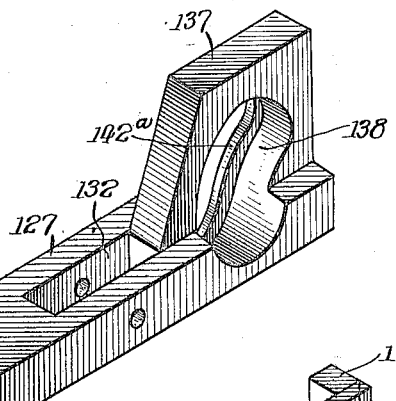
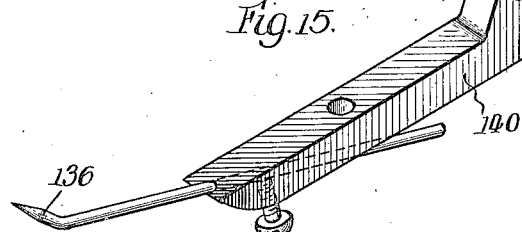
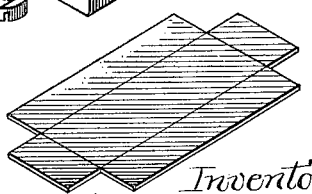

Patented Aug. 14, 1923.

1,464,649

UNITED STATES PATENT OFFICE.

ARTHUR J. EVERS AND HERBERT J. SAUVAGE, OF CHICAGO, ILLINOIS, ASSIGNORS TO ALBERT A. ARNOLD, OF OAK PARK, ILLINOIS.

BLANK CUTTING AND TRANSPORTING MECHANISM.

Application filed February 2, 1922. Serial No. 533,520.

*To all whom it may concern:*

Be it known that we, ARTHUR J. EVERS and HERBERT J. SAUVAGE, citizens of the United States, and residents of Chicago, in the county of Cook and State of Illinois, have invented certain new and useful Improvements in Blank Cutting and Transporting Mechanisms, of which the following is a specification.

The present invention relates to machines for acting on blanks, such as flat blanks of pasteboard, strawboard, and the like, and concerns more particularly or especially improved and novel means for feeding or transporting the blanks, preferably in groups or multiples from one magazine or storage-compartment to another with intermediate means for cutting out the corners of the blanks or otherwise modifying their physical characteristics.

In the particular machine set forth in detail in this patent, presenting a preferred embodiment of the invention, the corners of pasteboard blanks are cut out preliminary to their employment in the production of boxes, but the exact action which takes place with respect to the blanks is of little moment, as compared with the means for feeding, transferring, and stacking the unfinished and completed blanks.

In accordance with the principles of this invention, the blanks are removed in groups from the bottom portion of a stack in a supply-magazine, fed to and operated upon by cutters, and delivered to the bottom portion of a stack of finished blanks in another magazine or storage-compartment.

The means for accomplishing this result is believed to be novel and constitutes the principal feature of the invention, the construction being such that new blanks may be added to the supply-magazine and completed or corner-cut blanks removed from the other magazine without in any way interfering with the action of the machine.

In order that those skilled in this art may have a full and complete understanding of the invention and the various benefits and advantages accruing from its use, such a preferred and desirable embodiment of the invention has been illustrated in the accompanying drawings forming a part of this specification and throughout the several views of which like reference characters have been employed for the same parts.

In these drawings:

Figure 2 is a side elevation of the machine;

Figure 3 is a rear end elevation of the mechanism;

Figure 4 is a fragmentary enlarged vertical cross-section on substantially line 4—4 of Figure 2 with the parts viewed in the direction indicated by the arrows;

Figure 5 is a longitudinal vertical section on substantially line 5—5 of Figure 1;

Figure 6 is a vertical cross-section illustrating the parts shown in the upper portion of Figure 3 with the finished blank magazine filled with a stack of such blanks;

Figure 7 is a horizontal section on line 7—7 of Figure 5 and illustrates the four cutters for removing the four corner portions of the blanks;

Figure 8 is a vertical section, similar to the right-hand portion of Figure 5, illustrating the method of operation of the parts acting upon the blanks in the supply magazine;

Figure 9 is a similar section of a portion only of Figure 8 showing on an enlarged scale the supply magazine and its associated elements;

Figures 10 and 11 are details of the blank elevator at the delivery end of the mechanism;

Figure 12 is a detail view of a small portion of the supply-magazine;

Figure 1:
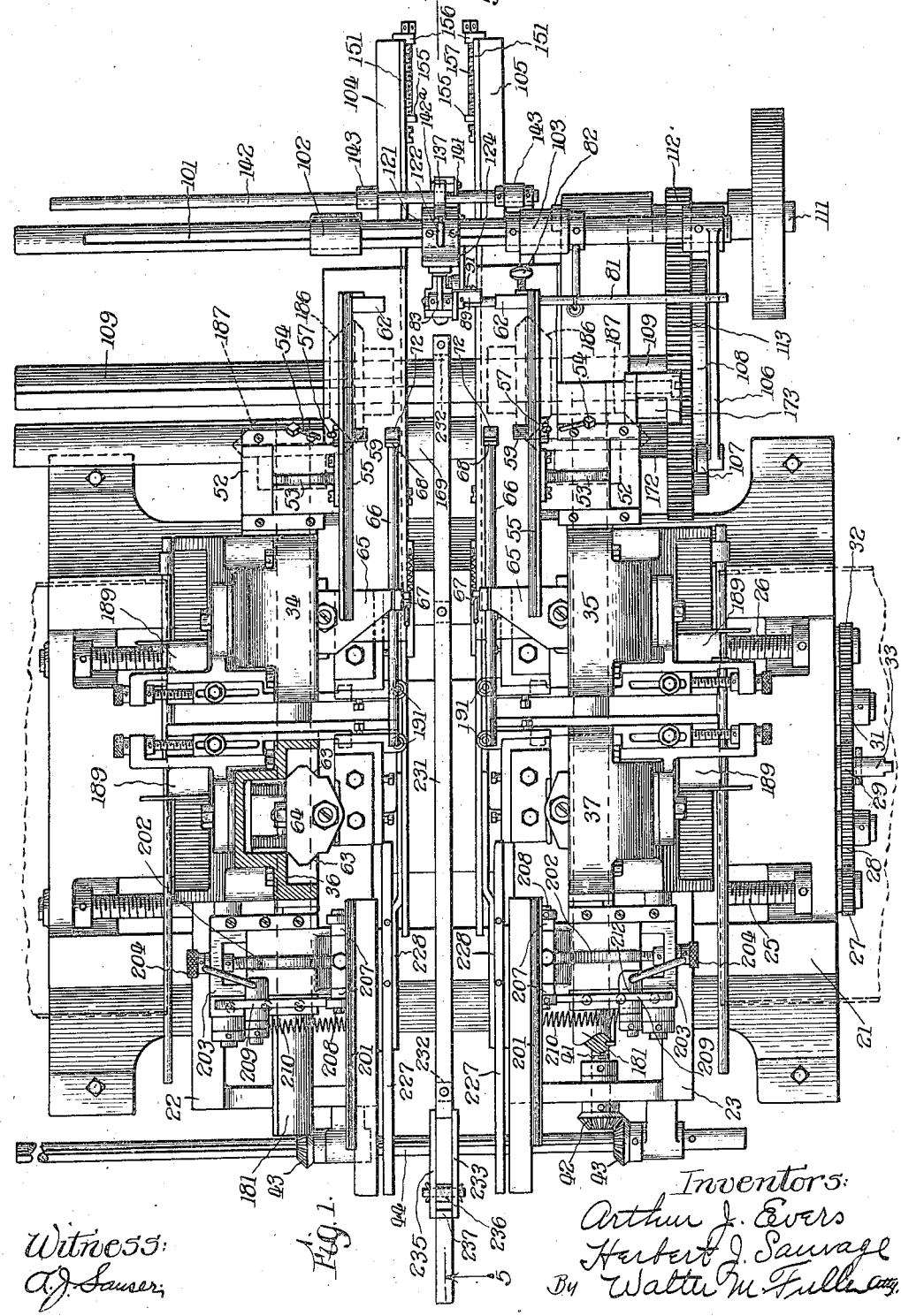
Figure 1 is a plan view of the machine with certain parts broken away to more clearly illustrate the construction.

Figures 13, 14, and 15 illustrate details of the construction of the blank feeding mechanism associated with the supply magazine;

Figure 16 shows one of the pasteboard blanks; and

Figure 17 illustrates such a blank after its corners have been cut out.

As is clearly depicted in these drawings, the machine includes a suitably-shaped base 21 carrying two members 22 and 23 slidable crosswise the base for adjustment purposes, as will be clearly understood after the remainder of the mechanism has been described in detail.

In order to effect such sliding adjustment, each of the parts 22 and 23 has secured thereto two depending, internally-threaded lugs 24 (Figures 2 and 4), these four lugs accommodating a pair of suitably-journaled, right and left hand, screw-threaded shafts 25 and 26, and in order that both of such shafts may be turned simultaneously and equally to effect correct adjustment movements of both members 22 and 23, these two shafts are connected together by a train of gearing as indicated in Figure 2, such gearing comprising the intermeshing gears 27, 28, 29, 31, and 32, the protruding portion of the shaft 33 of the middle gear 29 being equipped with a cross-pin, whereby a wrench may be applied thereto for turning the group of gears and the two shafts, all as will be readily understood.

Such supporting, lengthwise-disposed, adjustable, slide member 22 has rigidly mounted thereon an upright casting 34 of more or less hollow conformation, and such element 22 also carries a similar casting 36 adapted to be moved toward and from the casing 34 for adjustment purposes.

In like manner, the supporting member 23 carries a fixed casting 35 and an adjustable casting 37, it being understood that the two longitudinal halves of the mechanism are substantially duplicates and are separated from one another on the supporting base, which acts as a single foundation for the entire mechanism.

Each upright casting 36 or 37, as the case may be, is provided at its lower end with a sliding connection 38 with the corresponding supporting element 22 or 23, the casting having a depending threaded lug 39 accommodating an appropriately-supported screw or threaded shaft 41 equipped at the rear end of the machine with a bevel gear 42 in mesh with a bevel gear 43 on a cross-shaft 44, an end of which is supplied with a cross-pin 45 for the application of a turning wrench, whereby the manual turning of the shaft operates both sets of gears 42 and 43 and simultaneously and equally adjusts the two movable castings 36 and 37 and the parts which they carry.

Each casting 35 has mounted on it a forwardly-projecting bracket 51 on which is supported a second bracket 52 slidably receiving the base portion of a third bracket 53 adapted to be held in adjusted position crosswise the machine by a tightening or set screw 54.

Each of these brackets 53 has a vertical plate 55 secured to its inner face, the two plates conjointly forming a part of the supply-magazine for the blanks, and each of these plates is horizontally, longitudinally slotted at 56 to receive a clamping or holding device 57 of any suitable construction of an upright bar 59 at the inner side of the plate and having a portion 58 residing in the slot 56.

The lower end of each of these two upright bars 59 which form a part of the blank magazine is equipped with a pivoted, spring-pressed block or retaining finger forming a downward extension of the piece 59 and adapted to be swung rearwardly out of the way as a group of the blanks is caused to pass beneath the ends of such members 59.

As is shown in Figure 1, each of the four, upright castings 34, 35, 36, and 37 is internally provided with a pair of vertical guides 63, 63 slidingly accommodating a vertical, reciprocatory block 64, and each of such blocks, associated with the castings 34 and 35, is equipped with an inwardly-extended element 65 adjustably supporting and holding a horizontal rod 66, whose position may be changed or maintained by means of a manually actuated clamp 67 or tightening means of any appropriate character.

At its front end each of such rods 66 carries a vertical, socketed bar 68 internally receiving telescopically the cylindrical stem 69 of a foot block 71, the part 68 having an internal spring 73 pressing downwardly on the end of the stem 69, the telescopic movement of the two parts being limited by a pin and slot connection 74, 75 between them, the front face of part 71 having mounted thereon an upright blank-retaining strip 72 bevelled or bent flaring at its upper end.

The right-hand plate 55 of the supply-magazine, as the parts are viewed in Figure 1, adjustably carries a horizontal cross rod 81, which may be held fixedly in adjusted position by a clamping or set screw 82.

Opposite substantially the middle of the front of the pasteboard blank supply-magazine this rod has pivotally mounted thereon a bar 83 equipped at its lower end with a weight 84 connected thereto by an upright double pin and single slot connection 85, such weight having a normally-vertical face 86 adapted to engage the front edges of the stack or supply of blanks in the magazine, and provided also with a substantially-horizontal shoulder 87 designed and intended to rest on the top of the uppermost blank in the magazine.

Adjacent to such part 83, the rod 81 also has pivotally mounted thereon a depending bar 88 which is normally pressed toward the blanks in the magazine by reason of a leaf-spring 91 engaging its front edge, such spring being mounted on a block 89 fastened to the rod, the bar 88 at its lower end having a bevelled or pointed finger 92 adjacent to which is a recess or cavity 93 in its under surface, all as is clearly indicated in Figure 9.

A transverse shaft 101, provided with a longitudinal key way, is oscillatory in two bearings 102 and 103 secured to the sides of extensions 104 and 105 of the brackets previously referred to mounted on the castings 34 and 35, and at one end such shaft has an arm 106 fastened thereto, the end of the arm being provided with an anti-friction roller 107 traveling on the face of a cam 108 mounted on or keyed to a shaft 109 operated from a power-driven drive-shaft 111 through intermeshing gears 112 and 113, a convenient way of providing such cam being to mount it directly on the outer face of gear 113.

Substantially in register with the middle of the blank supply-magazine, shaft 101 is fitted with a collar 121 keyed thereto and provided with a tightening screw 122 to maintain the collar on the shaft at any desired point of adjustment thereon lengthwise the shaft.

A bar 124 is fastened to the side of such collar by means of screws 123, and the projecting end of such bar is equipped with an anti-friction roller 125 in register with and adapted to cooperate with the lower end portion of the pivoted, spring-pressed, depending bar 88.

The lower part or face of collar 121 has a groove 126 (Figure 13) slidingly receiving a block 127 of the configuration shown in Figure 14, the block being retained in the groove by a pair of plates 128, 128 fastened to the under side of the collar with a space between their adjacent edges. Block 127 has a projecting ribbed finger 129 provided near its extreme end with an aperture 131.

At its central portion, element 127 has a hole 132 through it to accommodate an upstanding perforated lug 133 of a lever or bar 140, a pivot or fulcrum pin 134 extending through apertures of and pivoting together the two members 127 and 140 with the part 133 in the opening 132.

The lever or arm 140 is normally pressed down at its rear portion by a spring 135 accommodated in part in registering cavities the two elements 127 and 140 and, at its extreme end, the member 140 is equipped with an adjustable, bent needle 136 adapted under certain conditions to project through the opening 131 and to engage the lowermost tilted blank in the supply-magazine in the manner hereinafter indicated.

Adjacent to the opening 132 the block 127 has an upward projection 137 supplied with a cam slot 138, one side of the projection having fastened thereto a plate 142ª overlapping slightly the edge of the cam groove for a purpose hereinafter designated.

The lever or piece 140 also has an offset, upwardly-extending projection 139 with a cam face, and one side of the part 139 has a plate 141 secured thereto and extended beyond the edge of such cam face in a manner similar to the way the plate 142ª extends beyond the cam surface of slot 138.

A stationary cross-rod 142 is mounted in suitable supports 143, 143 secured to the sides of the extensions 104 and 105, the rod being held by suitable collars against longitudinal movement with respect to one support or bearing 143 but not adapted to slide through the other bearing when the parts of the mechanism are adjusted to different positions.

Such rod or shaft carries an anti-friction roller 144 rotatable thereon and adapted to coact with the cam surfaces of the parts 137 and 138, the roller being retained between the plates 141 and 142ª against longitudinal displacement, such plates, however, shifting the roller lengthwise the shaft when the other parts are moved along the shaft 101 for adjustment.

The inner faces of the two parts 104 and 105 and of the castings 34 and 35 with which they are associated are horizontally grooved and provided with upper and lower, horizontal, retaining plates 151 and 152 partially overlapping the groove with a space between their adjacent edges, the upper plate 151 being somewhat longer than the corresponding lower plate 152 as illustrated in Figure 5.

Each groove is occupied by a slide 154 with an inwardly bent end 156, and the space between the edges of the two strips 151 and 152 is occupied by a bar 153 having a similar bent end 155, these two lugs or ears being connected together by an adjusting screw 157 whereby the relation of the two elements to one another may be readily modified.

Bar 153 has two screw and slot guiding connections 158 and 159 with the inner bar 154 permitting the relative adjustment specified and designed to clamp the two bars together firmly if desired.

Bar 153 has a dog or blank pusher 161 pivoted to it at 162, such element or finger being connected by a coil contractile spring 163 to a block 164 fastened to the part 153 and having a shoulder 165 cooperating with the tail of the finger to limit its upward movement and therefore to determine the extent to which such member may project or extend beyond the upper faces of the parts on which the blanks rest.

In somewhat similar manner, the rear end of the slide 153 is equipped with another, pivoted, blank finger or pusher 166 as is clearly illustrated in Figure 8.

Each slide 154 is provided with rack-teeth 167 along its under edge which are in mesh with the teeth of a spur gear 168 on a cross-shaft 169 revoluble in suitably-mounted depending bearings 171, an end portion of such shaft having pinion 172 in mesh with a vertically-reciprocatory rack 173 forming part of a slide straddling shaft 109 and equipped with a roller 175 traveling in a cam groove 176 cut in the inner face of the gear 113, whereby the rotation of the cam effects the reciprocation of the rack 173, the oscillation of shaft 169 and its two gears 168, and the reciprocation of the two slides, one on each half of the machine.

A right-angle knife 180 is adjustably mounted on the internal reciprocatory block 64 of each of the four, upright, castings 34, 35, 36, and 37, each of such blocks being reciprocated by means of a longitudinal shaft 181 (one for each half of the machine) operating an eccentric 182 and a connecting-rod 183 pivoted to the block at 184, each of such shafts 181 being revoluble in bearings 185 in the castings and being rotated by intermeshing bevel-gears 186, 187 connecting it operatively to the shaft 109 previously referred to.

Each such right-angle knife 180 coacts with a companion, hollow, right-angle shear member 188 mounted in the corresponding casting and supplied below it with a chute 189 for the sidewise discharge of the pieces of pasteboard cut out from the blanks.

These blocks 64 may be equipped with any suitable hold-down means for maintaining the blanks in place during the action of the cutting knives and may include, for instance, the downwardly-pressed spring-actuated plungers 191 and any other appropriate means, if desired or necessary.

In order to direct the passage of the stack of blanks to proper position with respect to the cutting knives, each of the four upright castings is equipped with a screw-adjusted guide 192 desirably properly bevelled on its under face to guide the blanks to and hold them in proper position during the shearing operation.

The rear magazine for the temporary storage of the finished or corner-cut blanks, which have been acted upon by the knives, comprises in part two, opposite upright plates 201, 201, one on each half of the adjustable mechanism described, each mounted on a bracket 202 slidable crosswise the machine in a guide member 203 by means of a screw 204, such adjusting mechanism being of the usual type and character.

At each side of the magazine, the stack of blanks 205 therein is supported on a horizontal bar 206 carried on the lower end of two arms 207 hinged at the top of bracket 202 at 208, one of such arms being connected by a link 209 through an adjustable pin and slot connection 212 with the upright arm 211 of a bell-crank fulcrumed at 213, the other arm 214 of the bell-crank lever carrying an anti-friction roller 215 riding on the edge of a cam 216 fastened on the corresponding shaft 181, as is clearly indicated in Figure 3.

On the end of the corresponding casting 36 or 37, as the case may be, there is a guideway 221 accommodating a vertically-operable slide 222 equipped at its lower end with a roller 223 in a cam groove 224 cut in the side of a cam 225 fastened to or rotatable with the shaft 181. This reciprocatory element 222 carries a bent bracket 226 on which is mounted a horizontal straight bar 227 and a horizontal bent bar 228, an offset portion of which is positioned just outside of the extended portion of the bar or plate 151.

The two elevator bars 227, 228 are desirably adjustably mounted on the bracket 226 by means of an adjusting screw 229, whereby the position of the bars lengthwise the machine may be readily modified, the inner ends of the two bent bars acting as guides or stops for the bunch or group of blanks positioned beneath the cutters ready for the shearing operation.

Through the middle of the machine, midway between its two parts, a horizontal blank-supporting bar 231 is provided which is carried on upright legs 232, the end of the bar adjacent to the cut-blank magazine having a block apertured for the reception of the bar being longitudinally adjustable thereon and capable of being held in adjusted position by a tightening screw 234 (Figure 2), the top surface of this bar being inclined or bevelled at 235 with an anti-friction roller 236 at the top of the incline, the end of the block also having an upstanding abutment 237.

Assuming that the several parts of the mechanism have been properly adjusted by the several means previously described to handle blanks of the desired size and shape, and assuming, furthermore, that the supply blank magazine at the front of the machine is filled with rectangular blanks of the shape shown in Figure 16, and that the cut blank magazine at the rear of the machine is holding a supply of severed blanks which rest on the pair of supporting bars 206, 206, and assuming, in addition, that the drive shaft 111 is being rotated from any suitable source of power, the operation of the several coacting instrumentalities embodied in the machine will occur substantially as follows.

So far as the blank supply magazine is concerned, the spring-pressed retainers 61 are in their lowermost position and extend to the bottom of the magazine, it being understood that the stack of blanks 300 in such magazine rests upon the brackets of which the parts 104 and 105 form extensions and also upon the intermediate, supporting, longitudinal bar 231.

At this time also the guides or holders 72 carried by the supports for the reciprocatory knives are down in their lowermost position as indicated in Figure 9.

The weight 84 overlies and imposes its weight on the pile, provided the latter is not of sufficient height to be of adequate weight of itself. In other words, the weight 84 comes into action when the stack or pile of blanks becomes somewhat depleted. It is held out of the way by such stack if the latter is of a height to be of proper or sufficient weight.

The member 88 occupies the position shown in Figure 9 just to the front of the stack of blanks, its toe 92 engaging such front face of the stack, and the other parts are in the positions indicated in such figure.

At the proper moment, shaft 101 is rocked by the mechanism previously described causing the finger 129, by reason of its rocking movement and also because of its cam connection with the stationary shaft 142, to travel toward the pile in the magazine and to rise at the same time inserting its sharp front edge in the stack with the desired number of blanks, say eight or ten, below it.

Such movement of the finger tilts that portion of the stack above it, as shown in Figure 8, and at the same time the corresponding travel of the plate 124 has caused its roller 125 to contact with the adjacent curved face or edge of the arm 88 to carry its lower end or bevelled toe in under the tilted pile, thus preventing the adhesion of any of the lower blanks to the tilted ones and preventing partial tilting of any of the lower group.

Near the end of this upward and rearward stroke of the finger 129, the needle 136 is caused to rise through the opening 131, by reason of the engagement of the cam face of the projection 139 with the relatively stationary roller 144, and to press slightly into the under face of the lowermost tilted blank to prevent the latter from being drawn out of the magazine during the rearward discharge movement of the stack of blanks below it.

The cutters then rise after having completed a preceding shearing operation and carry with them the retainers 72, that is to say, the latter are lifted sufficiently to permit the discharge beneath them of the horizontal group of blanks resting on the bottom of the supply magazine.

Thereupon the two pushers 161 travel rearwardly carrying ahead of them the plurality of horizontal blanks in the supply-magazine beneath the tilted ones, such group of blanks automatically temporarily rocking the pivoted retainers 61 out of the way and leaving the magazine beneath the retainers 72 which are now elevated sufficiently for this purpose.

As this group of blanks is thus fed along they are guided into proper position beneath the knives by the bevelled guides 192 and possibly other members if these are desirable.

This set of blanks having been thus delivered from the supply magazine, the retaining stops 61 immediately automatically rock back to normal operative position under the action of their controlling springs.

When the four knives descend to cut out the corners of the blanks now positioned beneath them, the two guides or gauges 72 descend to close the gap at the lower end of the supply-magazine through which such group of blanks had previously passed.

The reverse rocking movement of shaft 101 causes the retraction of the needle from the lowermost tilted blank and the withdrawal of the lifting finger 129, and the member 88 being now free to swing outwardly the stack of blanks in the supply-magazine either due solely to their own weight or supplemented by that of the member 84 descends so that all of the blanks occupy horizontal positions as shown in Figure 9, whereupon a repetition of the action of the mechanism just described will deliver the next group of blanks from the bottom of the stack.

As the front feed fingers or dogs 161 move rearwardly to feed the group of blanks to the cutting knives, as described, the latter are rising to permit the rear feed dogs 166 to push the preceding stack of cut blanks toward the stacker or storage magazine.

At this time the elevator 127, 128 is down and the feed dogs or fingers 166 push the group of cut blanks into place under the stacker.

Roller 236 is provided to prevent the middle portion of the stack of blanks in the storage-magazine from sagging unduly, and as the new group of blanks is fed rearwardly its back edge portion ascends the incline 235 and becomes easily inserted by reason of the presence of the roller in under the pile of blanks above it.

The elevator then rises and forms a guide or stop for the rear edges of the group of blanks which is pushed to the knives by the feed dogs 161, and it also elevates the group of cut blanks to the stack.

At the same time as the elevator is thus rising or lifting the set of cut blanks, the bars 206 which support the blanks in the storage-magazine separate or move outwardly allowing the stack in the magazine to descend or fall on the group below it being elevated.

The elevator moves upwardly to lift the combined stack and new group above the plane of the magazine bars 206, 206 and these then move inwardly or toward one another to hold the now augmented stack.

The elevator descends and both sets of feed dogs or fingers move forwardly each to engage its new bunch of blanks, the rear dogs to act on a cut set of blanks and the forward dogs to coact with an uncut set, as described above. These dogs being pivoted rock downwardly to pass beneath the groups of blanks which on their reverse movement they are to feed rearwardly, all as will be readily understood.

While one embodiment only of this invention has been illustrated and described, those skilled in this art will readily understand that the invention is susceptible of a variety of embodiments and that many minor mechanical changes may be made in the construction without departure from the heart and essence of the invention and without the sacrifice of any of its substantial benefits and advantages.

We claim:

1. In a mechanism of the character described, the combination of a supply-magazine for flat blanks, means to act on a plurality of superposed blanks at a time to modify their physical characteristics, a storage-magazine for the modified blanks, means to feed simultaneously a plurality of blanks resting on one another from the bottom of said supply-magazine to said modifying means, and means to feed said plurality of modified blanks simultaneously into the bottom of said storage-magazine beneath the stack of blanks therein.

2. In a mechanism of the character described, the combination of a supply-magazine for flat blanks, means to act on a plurality of superposed blanks at a time to modify their physical characteristics, a storage-magazine for the modified blanks, means to lift the blanks in the supply-magazine with the exception of a group at the bottom thereof, means to feed said group from the bottom of said supply-magazine to said modifying means, and means to feed said plurality of modified blanks into said storage-magazine.

3. In a mechanism of the character described, the combination of a supply-magazine for flat blanks, means to act on a plurality of superposed blanks at a time to modify their physical characteristics, a storage-magazine for the modified blanks, means to lift the blanks in the supply-magazine with the exception of a group at the bottom thereof, means to feed said group from the bottom of said supply-magazine to said modifying means, and means to feed said plurality of modified blanks into the bottom of said storage-magazine beneath the stack of blanks therein.

4. In a mechanism of the character described, the combination of a supply-magazine for flat blanks, means to act on a plurality of superposed blanks at a time to modify their physical characteristics, a storage-magazine for the modified blanks, means to tilt the superposed blanks in the supply-magazine with the exception of a group at the bottom thereof, means to intermittently actuate said tilting means, means to feed said group of superposed blanks from the bottom of said supply-magazine to said modifying means, and means to feed said plurality of modified blanks into said storage-magazine.

5. In a mechanism of the character described, the combination of a supply-magazine for flat blanks, means to act on a plurality of superposed blanks at a time to modify their physical characteristics, a storage-magazine for the modified blanks, means to tilt the superposed blanks in the supply-magazine with the exception of a group at the bottom thereof, means to intermittently actuate said tilting means, means to feed said group of superposed blanks from the bottom of said supply-magazine to said modifying means, and means to feed said plurality of modified blanks into the bottom of said storage-magazine beneath the stack of blanks therein.

6. In a mechanism of the character described, the combination of a supply-magazine for flat blanks, means to act on a plurality of superposed blanks at a time to modify their physical characteristics, a storage-magazine for the modified blanks, means to tilt the superposed blanks in the supply-magazine with the exception of a group at the bottom thereof, a needle, means to cause said needle to engage the undermost blanks of the tilted supply to prevent its withdrawal, means to feed said bottom group of blanks from said supply-magazine to said modifying means, and means to feed said group of modified blanks into said storage-magazine.

7. In a mechanism of the character described, the combination of a supply-magazine for flat blanks, means to act on a plurality of superposed blanks at a time to modify their physical characteristics, a storage-magazine for the modified blanks, means to tilt the superposed blanks in the supply-magazine with the exception of a group at the bottom thereof, a needle, means to cause said needle to engage the undermost blank of the tilted supply to prevent its withdrawal, means to feed said bottom group of blanks from said supply-magazine to said modifying means, and means to feed said group of modified blanks into the bottom of said storage-magazine beneath the stack of blanks therein.

8. In a mechanism of the character described, the combination of a supply-magazine for flat blanks, means to act on a plurality of superposed blanks at a time to modify their physical characteristics, a storage-magazine for the modified blanks, means to tilt the blanks in the magazine with the exception of a group at the bottom thereof, means to operate said tilting means, means to prevent tilting of any of the blanks of such lower group, means to actuate said preventive means, means to feed said group of blanks in superposed relation from the bottom of said supply-magazine to said blank-modifying means, and means to feed said plurality of modified blanks into said storage-magazine.

9. In a mechanism of the character described, the combination of a supply-magazine for flat blanks, means to act on a plurality of superposed blanks at a time to modify their physical characteristics, a storage-magazine for the modified blanks, means to tilt the blanks in the magazine with the exception of a group at the bottom thereof, means to operate said tilting means, means to prevent tilting of any of the blanks of such lower group, means to actuate said preventive means, means to feed said group of blanks in superposed relation from the bottom of said supply-magazine to said blank-modifying means, and means to feed said group of modified blanks into the bottom of said storage-magazine.

10. In a mechanism of the character described, the combination of a supply-magazine for flat blanks with a discharge passage in one side at the bottom thereof for the simultaneous discharge therethrough of a group of superposed blanks, means to act on a plurality of superposed blanks at a time to modify their physical characteristics, a storage-magazine for the modified blanks, means to open and close said discharge passage, means to feed the plurality of superposed blanks from the bottom of said magazine through said discharge opening to said modifying means, and means to feed said plurality of modified blanks into said storage-magazine.

11. In a mechanism of the character described, the combination of a supply-magazine for flat blanks, means to act on a plurality of superposed blanks at a time to modify their physical characteristics, a storage-magazine, means to support a stack of modified blanks in said magazine, means to move said supporting means into and out of operative position, an elevator to introduce a new group of modified blanks into the bottom of said storage-magazine, means to operate said elevator, means to feed a group of superposed blanks from said supply-magazine to said modifying means, and means to feed the group of modified blanks to said elevator.

12. In a mechanism of the character described, the combination of a supply-magazine for flat blanks, means to act on a plurality of superposed blanks at a time to modify their physical characteristics, a storage-magazine, means to support a stack of modified blanks in said magazine, means to move said supporting means into and out of operative position, an elevator to introduce a new group of modified blanks into the bottom of said storage-magazine, said elevator acting as a gauge for the blanks when acted upon by said modifying means, means to operate said elevator, means to feed a group of superposed blanks from said supply-magazine to said modifying means, and means to feed the group of modified blanks to said elevator.

13. In a mechanism of the character described, the combination of a supply-magazine for flat blanks, means to act on a plurality of superposed blanks at a time to modify their physical characteristics, a storage-magazine for the modified blanks, means to tilt the superposed blanks in the supply-magazine with the exception of a group at the bottom thereof, a needle, means to cause said needle to engage the undermost blank of the tilted supply to prevent its withdrawal, means to prevent tilting of any of the blanks of such lower group, means to actuate said preventive means, means to feed said group of blanks in superposed relation from the bottom of said supply-magazine to said blank-modifying means, means to support a stack of modified blanks in said storage-magazine, means to move said supporting means into and out of operative position, an elevator to introduce a new group of modified blanks into the bottom of said storage-magazine, said elevator acting as a gauge for the superposed blanks at the time they are acted upon by said modifying means, means to operate said elevator, means to feed a group of superposed blanks from said supply-magazine to said modifying means, and means to feed the group of modified blanks to said elevator.

ARTHUR J. EVERS.
HERBERT J. SAUVAGE.